US012626629B2

(12) United States Patent
Yang et al.

(10) Patent No.: US 12,626,629 B2
(45) Date of Patent: May 12, 2026

(54) SUB-PIXEL UNIFORMITY CORRECTION CLIP COMPENSATION SYSTEMS AND METHODS

(71) Applicant: Apple Inc., Cupertino, CA (US)

(72) Inventors: Maofeng Yang, Santa Clara, CA (US); Aaron J Perley, San Francisco, CA (US); Arthur L Spence, San Jose, CA (US); Chung Kai Chow, Austin, TX (US); David A Doyle, Cupertino, CA (US); Giovanni Azzellino, San Jose, CA (US); Jen-Wei Tsai, Taipei (TW); Kyung Hoae Koo, San Jose, CA (US); Michael H Lim, Cupertino, CA (US); Pankul Dhingra, San Diego, CA (US); Rangarajan Krishnan, Santa Clara, CA (US); Sreenath Rao Vantaram, San Jose, CA (US); Weijun Yao, Saratoga, CA (US); Xiaqing Dong, Shanghai (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/893,620

(22) Filed: Sep. 23, 2024

(65) Prior Publication Data

US 2025/0157378 A1 May 15, 2025

Related U.S. Application Data

(60) Provisional application No. 63/599,394, filed on Nov. 15, 2023.

(51) Int. Cl.
*G09G 3/20* (2006.01)

(52) U.S. Cl.
CPC ......... *G09G 3/2003* (2013.01); *G09G 3/2074* (2013.01); *G09G 2320/0233* (2013.01);
(Continued)

(58) Field of Classification Search
None
See application file for complete search history.

(56) References Cited

U.S. PATENT DOCUMENTS 11,205,378 B1 * 12/2021 Yang .................... G09G 3/3696
11,908,376 B1 2/2024 Wang et al.
(Continued)

FOREIGN PATENT DOCUMENTS

CN 107610649 A * 1/2018
CN 112419962 A 2/2021
(Continued)

OTHER PUBLICATIONS

Espacenet translation of CN107610649A (Year: 2018).*

*Primary Examiner* — Donna V Bocar
(74) *Attorney, Agent, or Firm* — Fletcher Yoder, P.C.

(57) ABSTRACT

An electronic device may include an electronic display having display pixels and pixel drive circuitry that selects an analog voltage for the display pixels based on a first gray-to-voltage mapping and display image data that is based on compensated image data. The electronic display may also include image processing circuitry that receives input image data in a gray level domain, converts the input image data to a voltage domain based on a second gray-to-voltage mapping different from the first, and applies voltage compensations to voltage levels of the input image data in the voltage domain to generate compensated voltage data. The image processing circuitry may also convert the compensated voltage data from the voltage domain to the gray level domain to generate the compensated image data based on a voltage-to-gray mapping that is the inverse of the first gray-to-voltage mapping.

20 Claims, 11 Drawing Sheets

(52) U.S. Cl.
CPC ............... *G09G 2320/0276* (2013.01); *G09G 2320/0626* (2013.01); *G09G 2320/0693* (2013.01)

(56) References Cited

U.S. PATENT DOCUMENTS

| | | | | |
|---|---|---|---|---|
| 2009/0058772 | A1 | 3/2009 | Lee | |
| 2010/0079362 | A1 | 4/2010 | Bu et al. | |
| 2017/0249890 | A1 | 8/2017 | Yoo et al. | |
| 2018/0336863 | A1* | 11/2018 | Zhang .................. | G09G 3/3648 |
| 2019/0088199 | A1* | 3/2019 | Zhang .................. | G09G 3/3208 |
| 2019/0237001 | A1 | 8/2019 | Lin et al. | |
| 2020/0219439 | A1 | 7/2020 | Wu et al. | |

FOREIGN PATENT DOCUMENTS

| | | | |
|---|---|---|---|
| CN | 114203116 | A | 12/2022 |
| CN | 117496913 | A | 2/2024 |
| KR | 2024003004 | A | 1/2024 |

* cited by examiner

SUB-PIXEL UNIFORMITY CORRECTION CLIP COMPENSATION SYSTEMS AND METHODS

CROSS-REFERENCE TO RELATED APPLICATIONS

This application claims priority to U.S. Provisional Application No. 63/599,394, entitled "Sub-Pixel Uniformity Correction Clip Compensation Systems and Methods," and filed Nov. 15, 2023, which is incorporated by reference herein in its entirety.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic devices with display panels, and more particularly, to schemes for sub-pixel uniformity correction (SPUC) on a display panel. For example, image processing circuitry may include a SPUC block to adjust the applied analog voltage (e.g., by pixel drive circuitry) to the display pixels by adjusting the image data provided thereto. In general, the SPUC block may convert input image data from a gray level domain to a voltage domain, compensate the voltage data, and convert the compensated voltage data to the gray level domain. However, as presently recognized, in some scenarios, the voltage compensation may decrease or increase the value of the voltage data to a level that is clipped by the minimum or maximum gray level, respectively, when converted back to the voltage domain.

As such, in some embodiments, the SPUC block may utilize a calibrated V2G mapping that expands the headroom and/or footroom of the gray level domain with respect to the voltage domain. In other words, a lower voltage data level may map to lowest gray level and/or a higher voltage data level may map to the highest gray level relative to the G2V mapping used prior to the voltage compensation. The calibrated V2G mapping may generate, from the compensated voltage data, compensated image data that is indicative of the same range of luminances, but a wider range of voltages than the input image data. Furthermore, the compensated image data may be provided to the pixel drive circuitry to drive the display pixels at the compensated voltages.

Additionally, the pixel drive circuitry may utilize a calibrated G2V (gray-to-voltage) mapping (e.g., an inverse mapping of the calibrated V2G mapping) to obtain the desired voltage levels for driving the display pixels. In other words, the extended voltage range of the compensated voltage data may be realized at the pixel drive circuitry, and the analog voltages corresponding to the compensated voltage data may be supplied to the display pixels. As such, by utilizing the calibrated V2G mapping and the calibrated G2V mapping, the headroom and/or footroom in the gray level domain may be increased to accommodate the compensated voltage data levels that would otherwise be clipped by the gray level domain.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
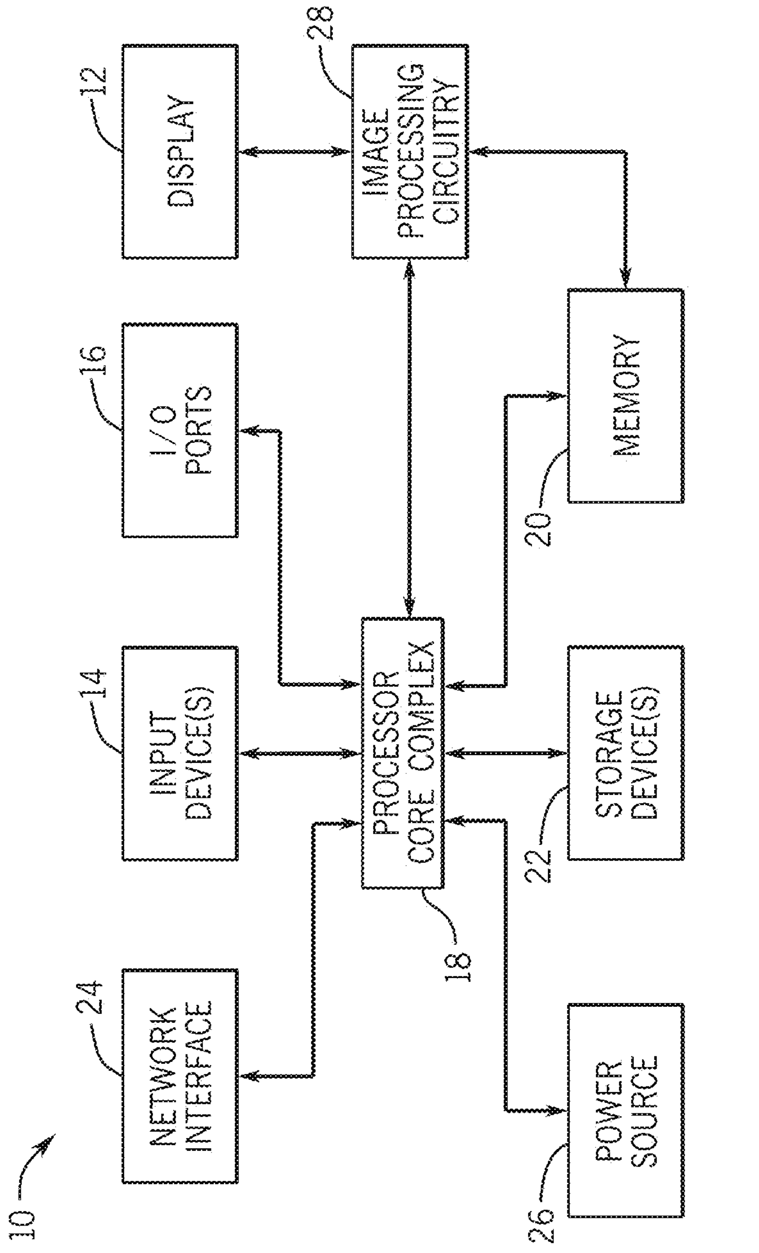
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each display pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

The display pixels of an electronic display may include self-emissive pixels such as light-emitting diodes (LEDs) (e.g., organic light-emitting diodes (OLEDs), micro-LEDs (μLEDs), active matrix organic light-emitting diodes (AMOLEDs), etc.) or transmissive pixels such as on a liquid crystal display (LCD). However, due to various properties associated with manufacturing of the display (e.g., manufacturing variations), driving the display pixels (e.g., crosstalk or other electrical anomaly), and/or other characteristics related to the display, different display pixels provided with the same gray level of image data may output different amounts of light (e.g., luminance). As such in some embodiments, the image data may be processed to account for one or more physical or digital effects associated with displaying the image data.

For example, in some embodiments, image processing circuitry may include a sub-pixel uniformity correction (SPUC) block (e.g., SPUC circuitry) to adjust the driving current and/or voltage for each pixel to account for differences in output luminance between the pixels, such as due to manufacturing variance. Indeed, some display pixels may exhibit different luminance outputs at the same voltage/current than other pixels, and such differences may be noted and/or preprogrammed during manufacturing to account for such differences. As discussed herein, the SPUC block may account for an adjustment to the voltage of a display pixel. However, as should be appreciated, the change in voltage may also be associated with a change in current, and the techniques discussed herein may be utilized to adjust either driving current or voltage.

In general, the SPUC block may adjust the driving current and/or voltage (e.g., provided by pixel drive circuitry to the display pixels) for the display pixels by adjusting the image data provided thereto. Furthermore, as the change to be applied is indicative of a change in applied voltage, the change to the image data may be applied in a voltage domain that represents the image data as a digital value (e.g., voltage data) of the voltage to be applied to a pixel. In some embodiments, input image data may be converted from a gray level domain to the voltage domain, generating voltage data, based on a G2V (gray-to-voltage) mapping. The G2V mapping may be panel specific (e.g., specific to the individual display panel, a manufactured batch of display panels, a model of the display panel, etc.). For example, the G2V mapping may provide a gamma or other optical calibration that correlates the gray levels to amounts of luminance desired to be displayed, which may vary based on the display panel. Additionally, as variations in manufacturing may cause differences between different display panels, the voltage compensation (e.g., adjustment) made in the voltage domain may be based on a voltage compensation map, which may be also be panel specific (e.g., specific to the individual display panel, a manufactured batch of display panels, a model of the display panel etc.).

Traditionally, the compensated voltage data may be converted back to the gray level domain via an V2G (voltage-to-gray) mapping that is the inverse of the G2V mapping. However, as presently recognized, in some scenarios, the voltage compensation may adjust the desired voltage level to a level that is clipped by the minimum or maximum gray level. For example, if a particular display pixel is naturally brighter than the average (e.g., expected) display pixel, a negative voltage compensation may be added to the voltage data to reduce the applied voltage. However, if the voltage compensation would reduce the voltage data past a lower threshold voltage data level corresponding the lowest gray level, the compensated voltage data may be effectively clipped at the lower threshold voltage data level when mapped back to the gray level domain (e.g., via the V2G mapping). In a similar manner, a naturally dimmer display pixel (e.g., relative to the average display pixel of the display panel) may receive a voltage compensation that is effectively clipped at an upper threshold voltage data level corresponding to a maximum gray level (e.g., when mapped back to the gray level domain, such as via the V2G mapping). Such clipping may reduce the effectiveness of the SPUC and result in visible artifacts such as luminance variations between display pixels being displayed.

As such, embodiments of the present disclosure may include a calibrated V2G mapping that expands the headroom and/or footroom of the gray level domain with respect to the voltage domain. In other words, the lowest gray level may be mapped to a calibrated lower threshold voltage level less than the lower threshold voltage data level and/or the highest gray level may be mapped to a calibrated higher threshold voltage level greater than the upper threshold voltage data level. Furthermore, in some embodiments, the calibrated V2G mapping may remap (e.g., relative to the G2V mapping) a portion of the gray levels, such as those below a lower tap point threshold and/or above an upper tap point threshold, such that certain tap points of the mappings are the same. Moreover, in some embodiments, the calibrated V2G mapping may remap (e.g., relative to the G2V mapping) the entire spectrum of gray levels, relative to the voltage domain, such that one or zero tap points remain in common with the G2V mapping. The calibrated V2G mapping may generate compensated image data indicative of the same range of luminances, but a wider range of voltages than the input image data. Furthermore, the compensated image data may be provided to the pixel drive circuitry to drive the display pixels at the compensated voltages.

In general, the pixel drive circuitry may convert gray level domain image data to the voltage domain for determining and/or selecting the desired analog voltages to drive the display pixels therewith. For example, the pixel drive circuitry may receive display image data (e.g., the compensated image data or display image data based on the compensated image data) and utilize one or more digital-to-analog converters, multiplexers, or other circuitry to generate, select, or otherwise obtain the analog voltages to drive the display pixels. As should be appreciated, in some embodiments, one or more image processing techniques, such as dithering, may occur on the compensated image data prior to being transmitted to the pixel drive circuitry. However, as the G2V mapping used prior to the voltage compensation does not map to the extended voltage range of the compensated image data, a calibrated G2V (gray-to-voltage) mapping may be utilized at the pixel drive circuitry to obtain the desired voltage levels for driving the display pixels. Moreover, the calibrated G2V mapping may be the inverse mapping (e.g., with the same tap points) of the calibrated V2G mapping. In other words, the extended voltage range of the compensated voltage data may be realized at the pixel drive circuitry to supply corresponding analog voltages to the display pixels. As should be appreciated, the pixel drive circuitry may or may not convert the display image data to digital voltage data (e.g., compensated voltage data) in the voltage domain prior to selecting the analog voltage for a display pixel. For example, in some embodiments, the pixel drive circuitry may directly select the analog voltage based on the display image data in accordance with the calibrated G2V mapping (e.g., implemented in hardware or software). Alternatively, the digital voltage data may be generated based on the display image data and the calibrated G2V mapping, and the analog voltage may be selected based on the digital voltage data. As such, by utilizing the calibrated V2G mapping and the calibrated G2V mapping, the headroom and/or footroom in the gray level domain may be increased to accommodate the compensated voltage data levels that would otherwise be clipped by the gray level domain.

With the foregoing in mind, FIG. 1 is an example electronic device 10 with an electronic display 12 having multiple display pixels. As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by or received from an image source, such as the processor core complex 18, a graphics processing unit (GPU), storage device 22, or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
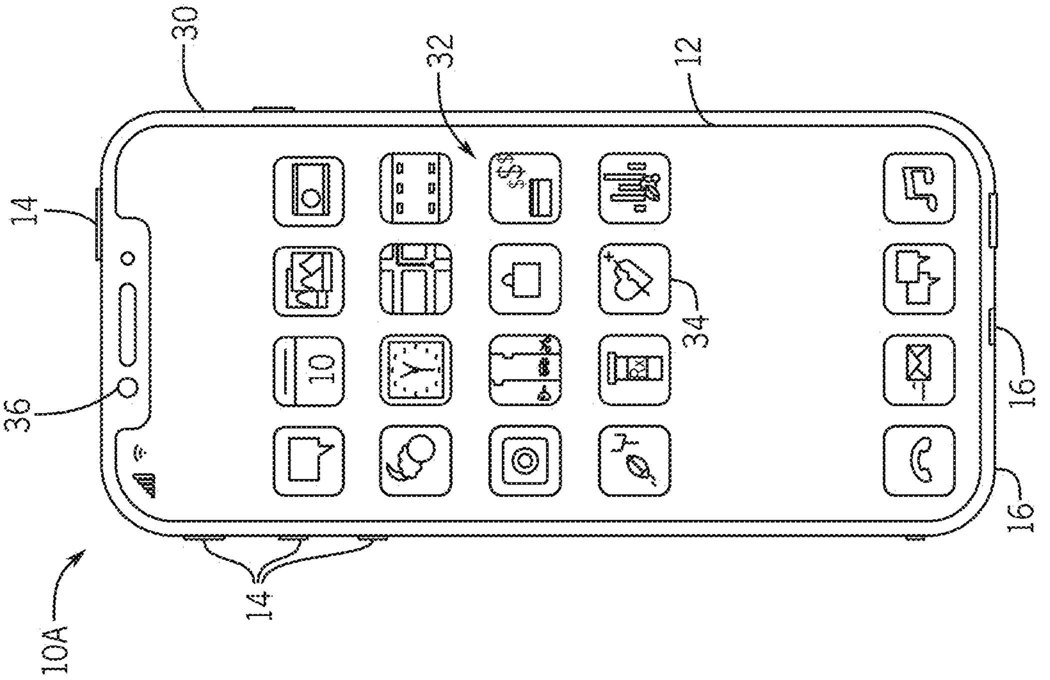
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
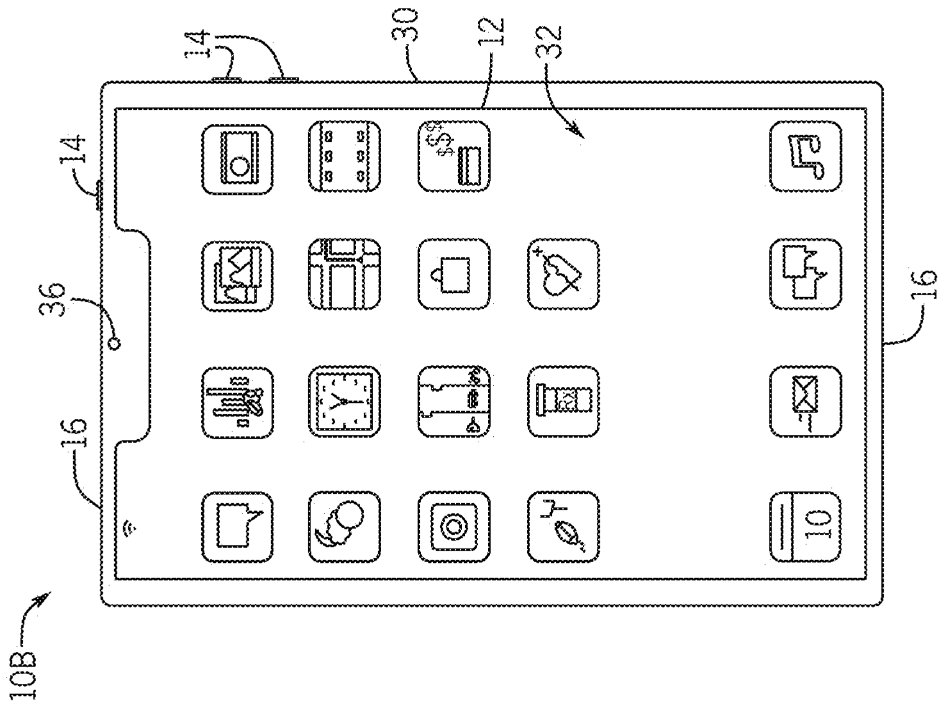
FIG. 3 is another example of the electronic device of FIG. 1 in the form of a tablet device, in accordance with an embodiment.
Figure 4:
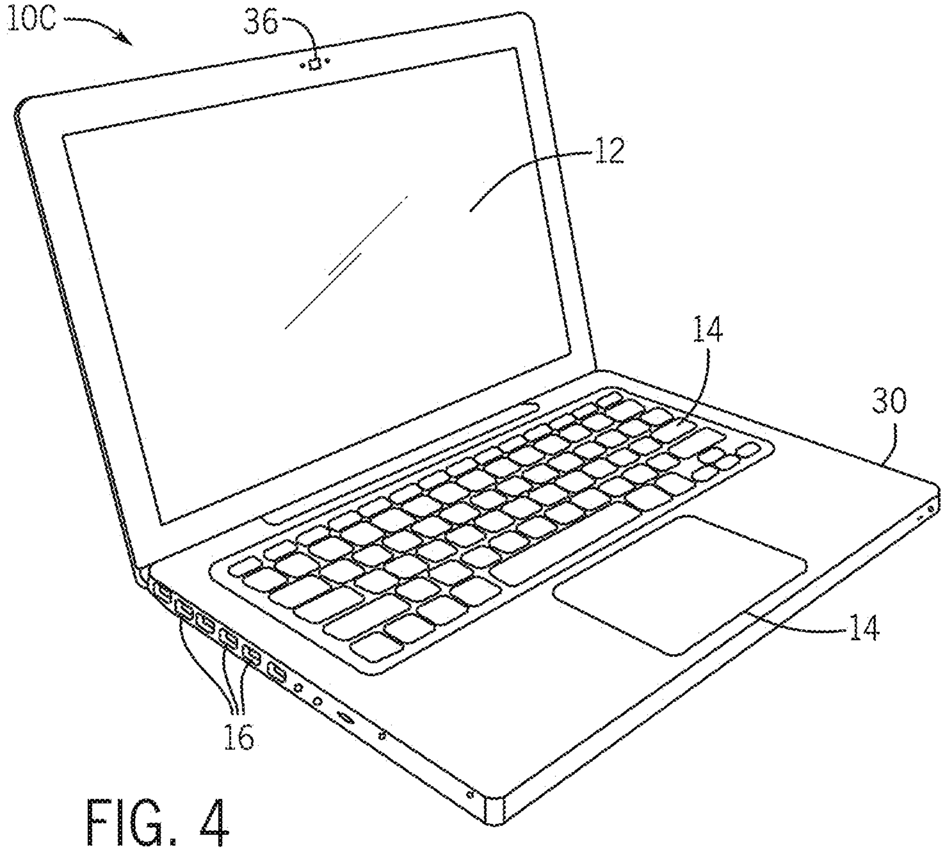
FIG. 4 is another example of the electronic device of FIG. 1 in the form of a computer, in accordance with an embodiment.
Figure 5:
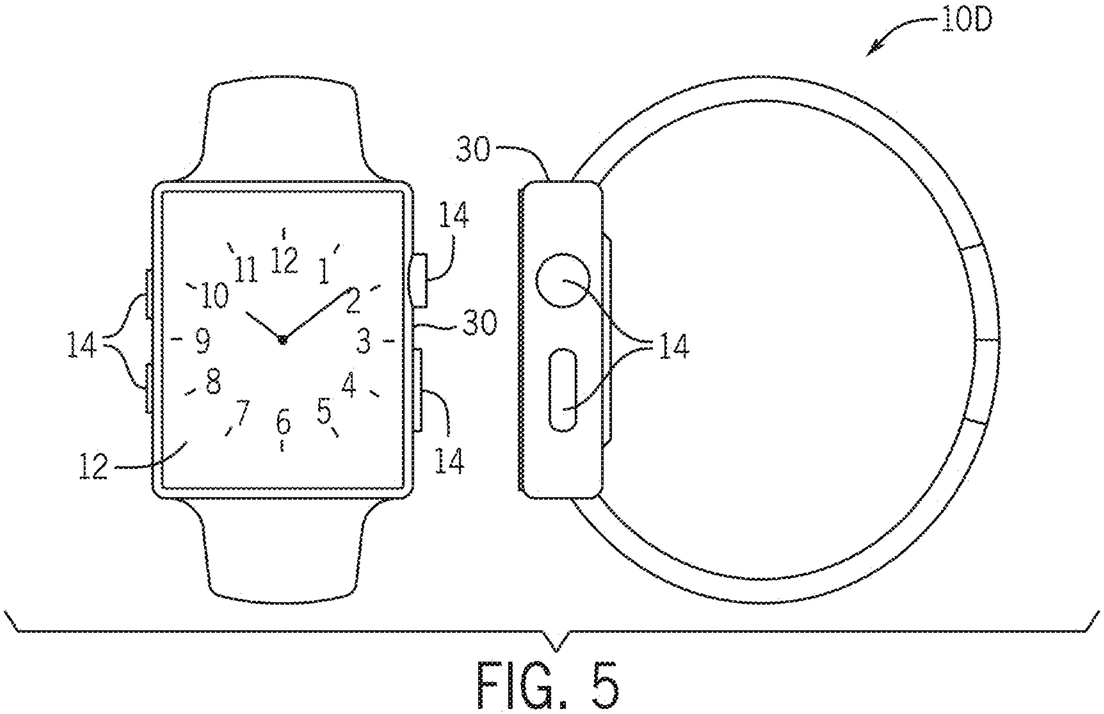
FIG. 5 is another example of the electronic device of FIG. 1 in the form of a watch, in accordance with an embodiment.

Another example of a suitable electronic device 10, specifically a tablet device 10B, is shown in FIG. 3. For illustration purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
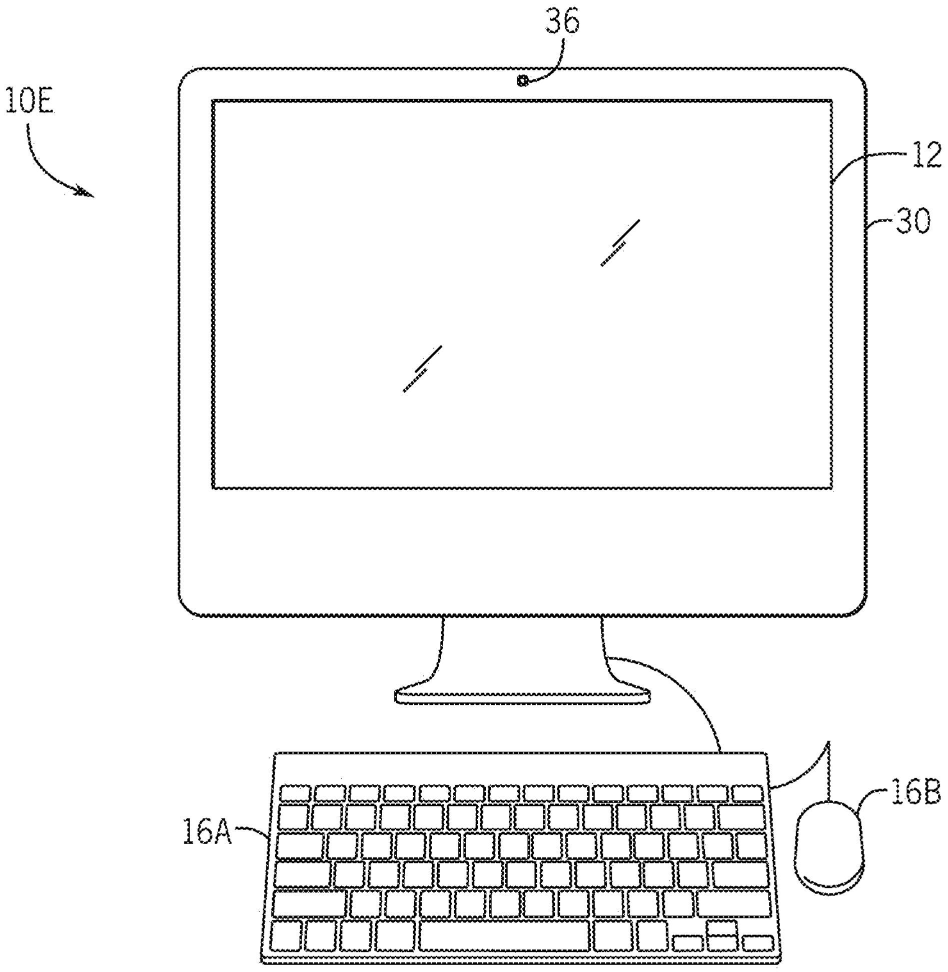
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an IMAC®, a MACBOOK®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. Moreover, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
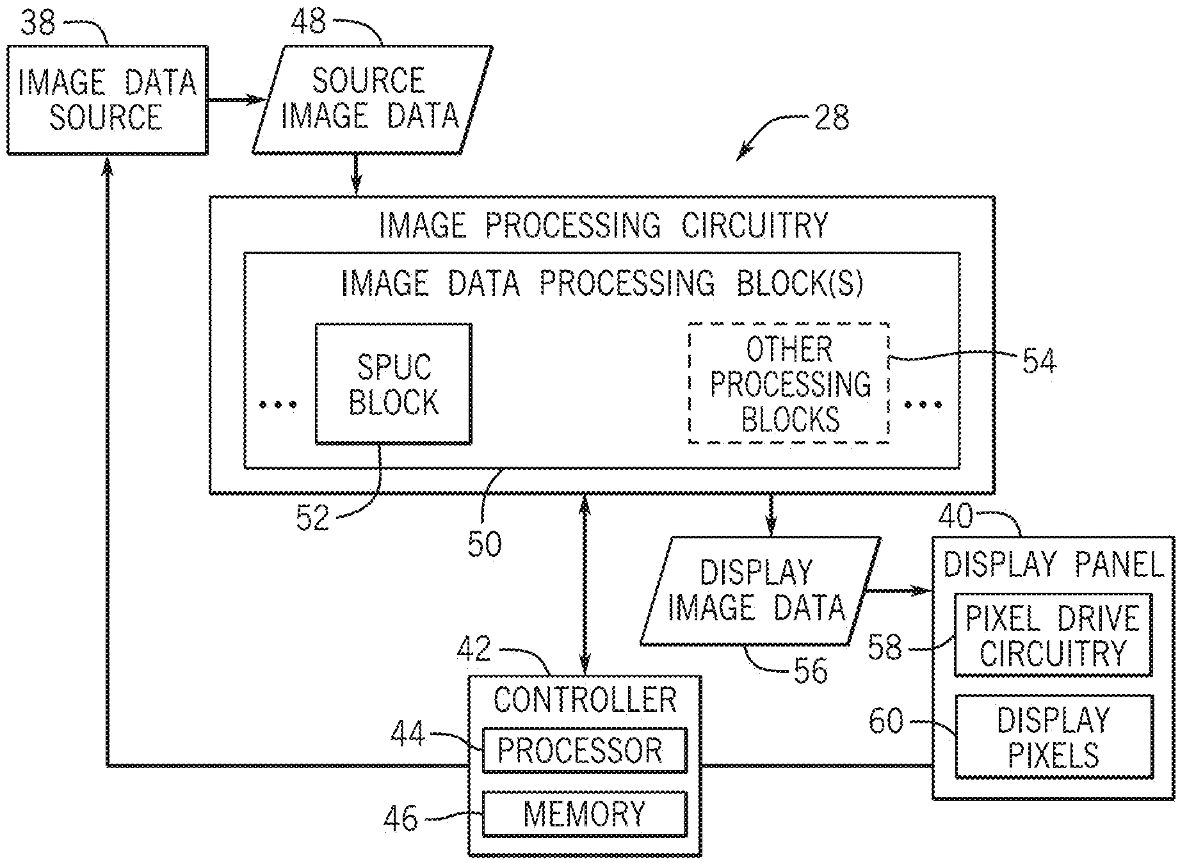
FIG. 7 is a schematic diagram of the image processing circuitry of FIG. 1 including a sub-pixel uniformity correction (SPUC) block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware and/or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display (e.g., organic light-emitting-diode (OLED) display, micro-LED display, etc.), a transmissive display (e.g., liquid crystal display (LCD)), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. Moreover, as used herein, pixel data/values of image data may refer to individual color component (e.g., red, green, and blue) data values corresponding to pixel positions of the display panel.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, processing stages, algorithms, etc.) such as a sub-pixel uniformity correction (SPUC) block 52. As should be appreciated, multiple other processing blocks 54 may also be incorporated into the image processing circuitry 28, such as a pixel contrast control (PCC) block, color management block, a dither block, a blend block, a warp block, a scaling/rotation block, etc. before and/or after the SPUC block 52. The image data processing blocks 50 may receive and process source image data 48 and output display image data 56 in a format (e.g., digital format, image space, and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50. After processing, the image processing circuitry 28 may output the display image data 56 to the display panel 40. Based at least in part on the display image data 56, analog electrical signals may be provided, via pixel drive circuitry 58, to display pixels 60 of the display panel 40 to illuminate the display pixels 60 at a desired luminance level and display a corresponding image.

Figure 8:
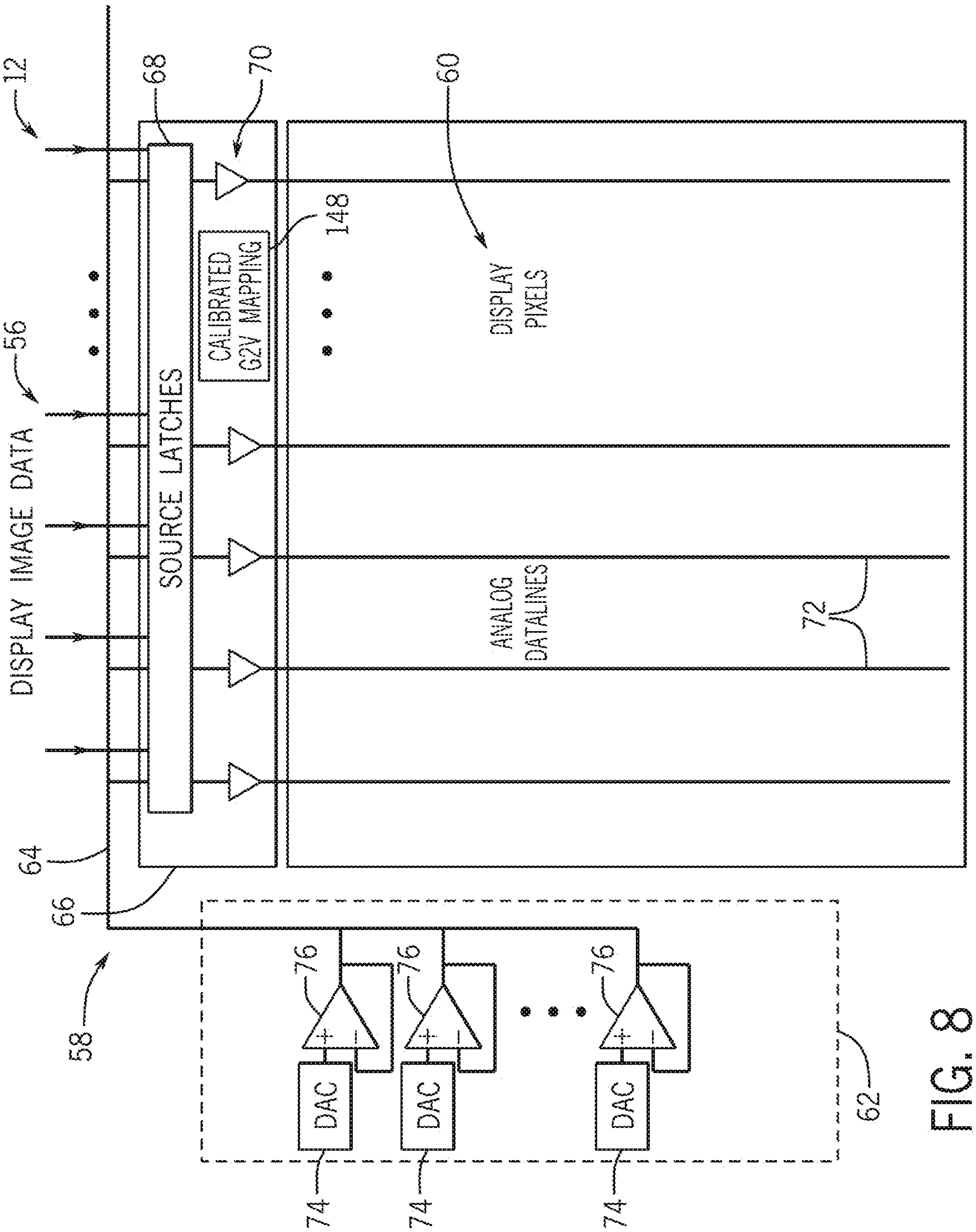
FIG. 8 is a schematic diagram of a gamma generator in electrical communication with a portion of an electronic display of FIG. 1, in accordance with an embodiment.

The pixel drive circuitry 58 may be utilized to provide suitable power to the display pixels 60. In some embodiments, the pixel drive circuitry 58 may generate one or more gamma reference voltages (e.g., supplied by a gamma generator) to be applied to the display pixels 60 to achieve the desired luminance outputs. To help illustrate, FIG. 8 is a schematic diagram of at least a portion of the electronic display 12, including the pixel drive circuitry 58 and the display pixels 60 in conjunction with a gamma generator 62. As described herein, the electronic device 10 may use one or more gamma generators 62 (e.g., a gamma generator 62 for each color component) and one or more respective gamma buses 64 for transmitting analog voltages to the display pixels 60 of an electronic display 12. A single gamma generator 62 with a single gamma bus 64 is discussed herein for brevity.

In some embodiments, the electronic display 12 may use analog voltages to power display pixels 60 at various voltages that correspond to different luminance levels. For example, the display image data 56 may correspond to original (e.g., source image data 48) or processed image data and contain target luminance values for each display pixel 60. As used herein, pixels or pixel data may refer to a grouping of sub-pixels (e.g., individual color component pixels such as red, green, and blue) or the sub-pixels themselves. Moreover, the pixel drive circuitry 58 may include one or more display drivers 66 (also known as source drivers, data drivers, column drivers, etc.), source latches 68, source amplifiers 70, and/or any other suitable logic/circuitry to provide the appropriate analog voltage(s) to the display pixels 60, based on the display image data 56. For example, in some embodiments, the circuitry of the display drivers 66 or additional circuitry coupled thereto may include one or more DACs and/or multiplexers to select (e.g., from the gamma bus 64), generate, or otherwise obtain an analog voltage based on the display image data 56. As such, the pixel drive circuitry 58 may apply power at a corresponding voltage and/or current to a display pixel 60 to achieve a target luminance output from the display pixel 60, based on the display image data 56. Such power, at the appropriate analog voltages for each display pixel 60, may travel down analog datalines 72 to the display pixels 60.

In some embodiments, the different analog voltages may be generated by a gamma generator 62 via one or more digital-to-analog converters (DACs) 74, amplifiers 76, and/or resistor strings (not shown). As discussed above, the different analog voltages supplied by the gamma bus 64 may correspond to at least a portion of the values of the display image data 56. For example, 8-bit display image data 56 per color component may correspond to 256 different gray levels and, therefore, 256 different analog voltages per color component. Indeed, display image data 56 corresponding to 8-bits per color component may yield millions or billions of color combinations and, in some embodiments, may include the brightness of the electronic display 12 for a given frame. As should be appreciated, the display image data 56 and corresponding voltage outputs may be associated with any suitable bit-depth depending on implementation and/or may use any suitable color space (e.g., RBG (red/blue/green), sRBG, Adobe RGB, HSV (hue/saturation/value), YUV (luma/chroma/chroma), Rec. 2020, etc.). Furthermore, the gamma bus 64 may include more or fewer analog voltages than the corresponding bit-depth of the display image data 56. For example, in some embodiments, the same analog voltages may be used for multiple gray levels, for example, via interpolation between analog voltages and/or pulse-width modulation of current flow to obtain the different perceived luminance outputs. In some embodiments, the gamma generator 62 and/or pixel drive circuitry 58 may provide the display pixels 60 with negative voltages relative to a reference point (e.g., ground). As should be appreciated, the positive and negative voltages may be used in a similar manner to operate the display pixels 60, and they may have mirrored or different mappings between voltage level and target gray level.

Additionally, in some embodiments, different color component display pixels 60 (e.g., a red sub-pixel, a green sub-pixel, a blue sub-pixel, etc.) may have different mappings between voltage level and target gray level. For example, display pixels 60 of different color components may have different luminance outputs given the same driving voltage/current. As such, in some embodiments, one or more gamma buses 64 may be used for each color component and/or voltage polarity. As should be appreciated, the mappings between voltage level and target gray level may depend on the type of display pixels (e.g., LCD, LED, OLED, etc.), the brightness setting, a color hue setting, temperature, contrast control, pixel aging, etc., and, therefore, may depend on implementation.

As discussed herein, the display pixels 60 (e.g., sub-pixels of individual color components) of an electronic display 12 may exhibit variations therebetween, such as due to manufacturing variances or other factors. For example, some display pixels 60, even those of the same color component, may exhibit different luminance outputs when supplied with the same voltage/current. As such, when displaying an image, image artifacts such as luminance variations may be perceived at one or more locations across the electronic display 12. As such, in some embodiments, the image processing circuitry 28 may include the SPUC block 52 (e.g., SPUC circuitry) to adjust the driving current and/or voltage for different pixels to account for differences in output luminance therebetween, such as due to manufacturing variance.

Figure 9:
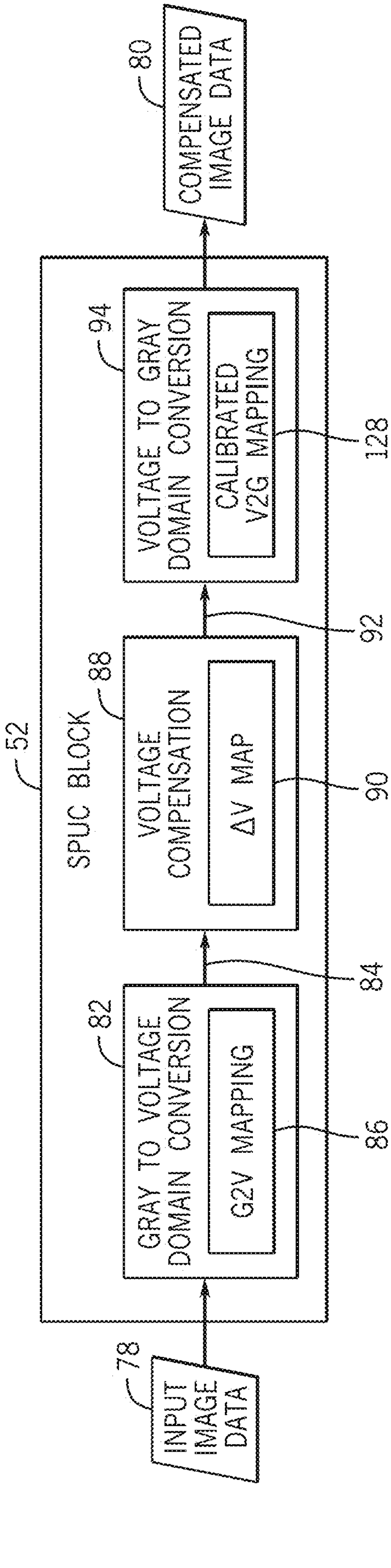
FIG. 9 is a schematic diagram of SPUC block of FIG. 7, in accordance with an embodiment.

In general, the SPUC block 52 may receive input image data 78 and generate compensated image data 80 based thereon to adjust the driving voltage (e.g., applied via the pixel drive circuitry 58) for the display pixels 60, as shown in FIG. 9. For example, the SPUC block 52 may enable voltage offsets to be applied to individual display pixels 60 to account for certain display pixels 60 being brighter or dimmer than others, when supplied with the same voltage. Furthermore, in some embodiments, the compensation to the input image data 78 may be applied in a voltage domain that represents the input image data 78 as a digital value of the voltage to be applied to the display pixels 60. For example, the voltage domain may be a linear domain such that differences between adjacent voltage levels in the voltage domain are of equal amounts (e.g., equal amounts of millivolts).

As such, in some embodiments, the SPUC block 52 may include a gray-to-voltage domain conversion sub-block 82 to convert the input image data 78 from a gray level domain to the voltage domain, generating voltage data 84, based on a G2V (gray-to-voltage) mapping 86. The G2V mapping 86 may be panel specific (e.g., specific to the individual display panel 40, a manufactured batch of display panels 40, a model of the display panel 40, etc.). Additionally, the G2V mapping 86 may provide or be based on (e.g., in accordance with) a gamma or other optical calibration that correlates the gray levels of the gray level domain to amounts of luminance that are desired to be displayed. Further, in some embodiments, different brightness settings of the electronic display 12 may correspond to different G2V mappings 86. For example, in some embodiments, a given gray level may correspond to different amounts of output luminance, and therefore different driving voltages, at different brightness settings of the electronic display 12. As should be appreciated, the brightness setting may be indicative of a global brightness (e.g., maximum total brightness) of the electronic display 12, and may be based on a user setting, a time of day, an ambient light reading, or other factor.

Furthermore, the SPUC block 52 may include a voltage compensation sub-block 88 that applies a voltage compensation map 90 to generate compensated voltage data 92. In general, the voltage compensation map 90 may include a per pixel map of compensations (e.g., voltage adjustments) to be applied to voltage data 84 of each display pixel 60. For example, each display pixel 60 or group of display pixels 60 may have an independent voltage compensation associated therewith. Furthermore, in some embodiments, the voltage compensation map 90 may depend on the brightness setting of the electronic display 12. Moreover, as variations in manufacturing may cause differences between different display panels 40, the voltage compensations (e.g., adjustments) of the voltage change map may be panel specific (e.g., specific to the individual display panel, a manufactured batch of display panels, a model of the display panel etc.).

Figure 10:
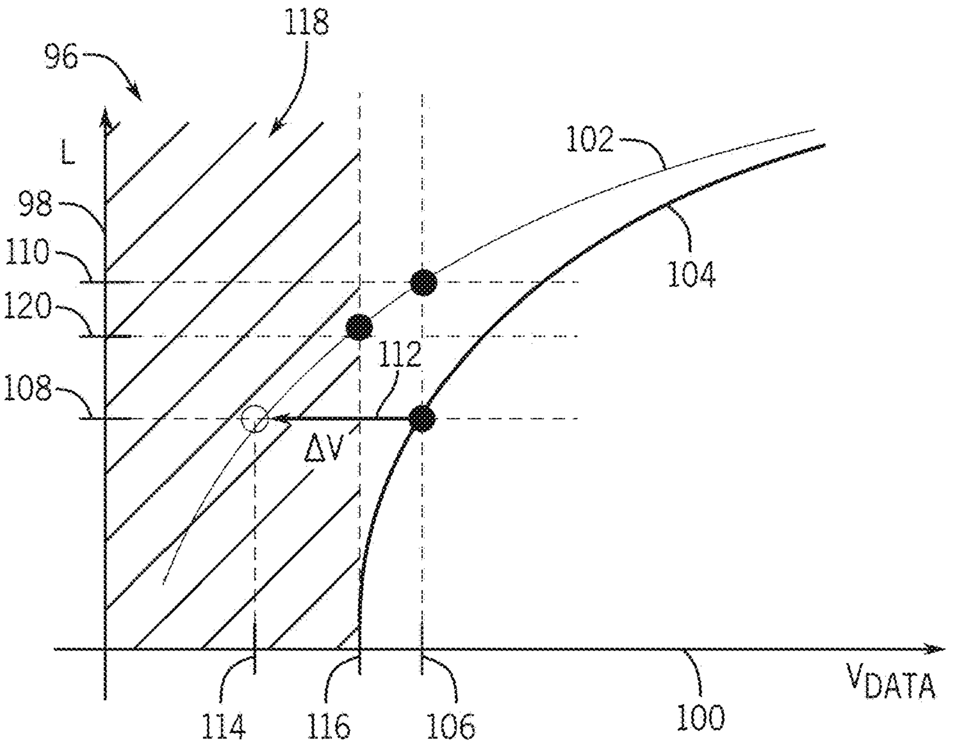
FIG. 10 is a graph of voltage data compensation of a SPUC, in accordance with an embodiment.

Additionally, the SPUC block 52 may include a voltage-to-gray domain conversion sub-block 94 to convert the compensated voltage data 92 into the compensated image data 80 (e.g., in the gray level domain). Traditionally, the compensated voltage data 92 may be converted back to the gray level domain via an V2G (voltage-to-gray) mapping that is the inverse of the G2V mapping 86. However, as presently recognized, in some scenarios, the voltage compensations (e.g., of the voltage compensation map 90) may adjust one or more values of the compensated voltage data 92 to a level that would be clipped by the minimum or maximum gray level if converted using such a V2G mapping. For example, as illustrated in the graph 96 of FIG. 10, the luminance 98 to voltage data level 100 profile of a first display pixel 102 may be naturally (e.g., incidentally due to manufacturing variance) brighter than the profile of the average display pixel 104 of the display panel 40. As such, a particular voltage data level 106 (e.g., of the voltage data 84) that would achieve a target luminance 108 for an average display pixel 60, may correspond to a higher luminance 110 for the first display pixel 102. As should be appreciated, the profile of the average display pixel 104 may be the expected profile of the display pixels 60 and/or an actual arithmetic mean profile of the display pixels 60 of the display panel 40.

To achieve the target luminance 108 for the first display pixel 102, a voltage compensation 112 ($\Delta V$) may be applied (e.g., according to the voltage compensation map 90) to the voltage data 84 to reduce the applied voltage to a reduced voltage level 114. However, in some scenarios, the voltage compensation 112 may reduce the voltage data level 100 past a lower threshold voltage data level 116 and into a clipped region 118. The lower threshold voltage data level 116 may correspond to the lowest gray level (e.g., in the gray level domain) and, thus, the compensated voltage data 92 may be effectively clipped at the lower threshold voltage data level 116 when mapped back to the gray level domain (e.g., via the V2G mapping). Furthermore, the difference between the target luminance 108 and a clipped luminance 120 (e.g., corresponding to the lower threshold voltage data level 116) may result in a perceivable luminance variation, such as a pixel luminance (e.g., clipped luminance 120) that is higher than desired.

Figure 11:
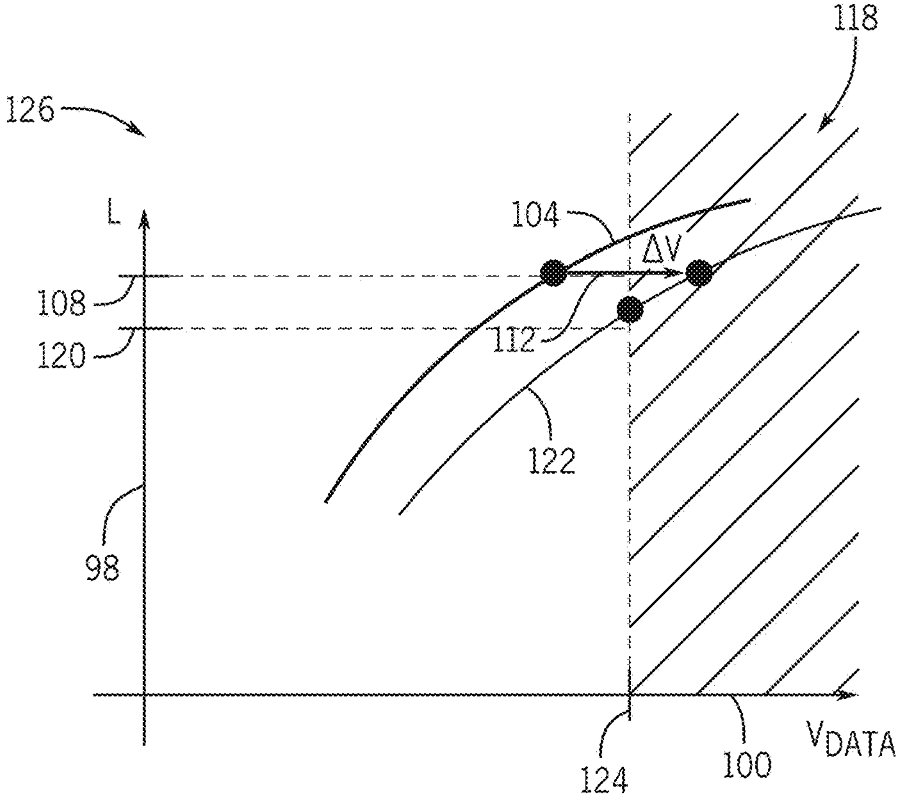
FIG. 11 is a graph of voltage data compensation of a SPUC, in accordance with an embodiment.

In a similar manner, the profile of a second display pixel 122 may be naturally dimmer than the profile of the average display pixel 104 of the display panel 40, and the voltage compensation 112 may be effectively clipped at an upper threshold voltage data level 124, corresponding to a maximum gray level (e.g., when mapped back to the gray level domain, such as via the V2G mapping), as shown in the graph 126 of FIG. 11. Such clipping may reduce the effectiveness of the SPUC and result in visible artifacts such as luminance variations between the display pixels 60, such as a pixel luminance (e.g., clipped luminance 120) that is lower than desired.

Figure 12:
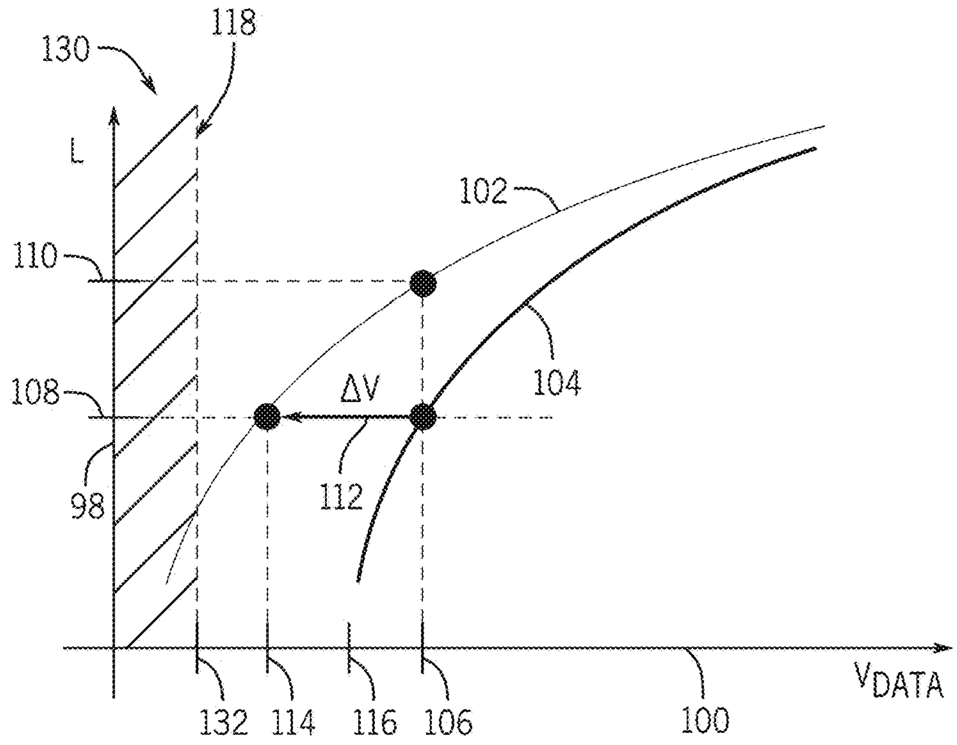
FIG. 12 is a graph of voltage data compensation of a SPUC with an increased footroom relative to a voltage domain, in accordance with an embodiment.

As such, in some embodiments the voltage-to-gray domain conversion sub-block 94 may utilize a calibrated V2G mapping 128 that expands the headroom and/or footroom of the gray level domain with respect to the voltage domain. To help illustrate, the graph 130 of FIG. 12 includes a calibrated lower threshold voltage level 132 less than the lower threshold voltage data level 116 with reference to the profile of the first display pixel 102 of FIG. 10. The calibrated lower threshold voltage level 132 may correspond to the lowest gray level in the calibrated V2G mapping 128. As such, the clipped region 118 may be shifted, and the voltage data level 100 (e.g., reduced voltage level 114) associated with the target luminance 108 made available. Additionally or alternatively, in a similar manner, the highest gray level may be mapped to a calibrated higher threshold voltage level greater than the upper threshold voltage data level to allow higher voltage data levels 100 to be utilized. Indeed, the calibrated V2G mapping 128 may be used to generate the compensated image data 80, indicative of the same range of luminances 98 (e.g., target luminances 108 corresponding to the gray levels of the input image data 78), but a wider range of voltages data levels 100 than the input image data 78 to achieve the target luminances 108.

Figure 13:
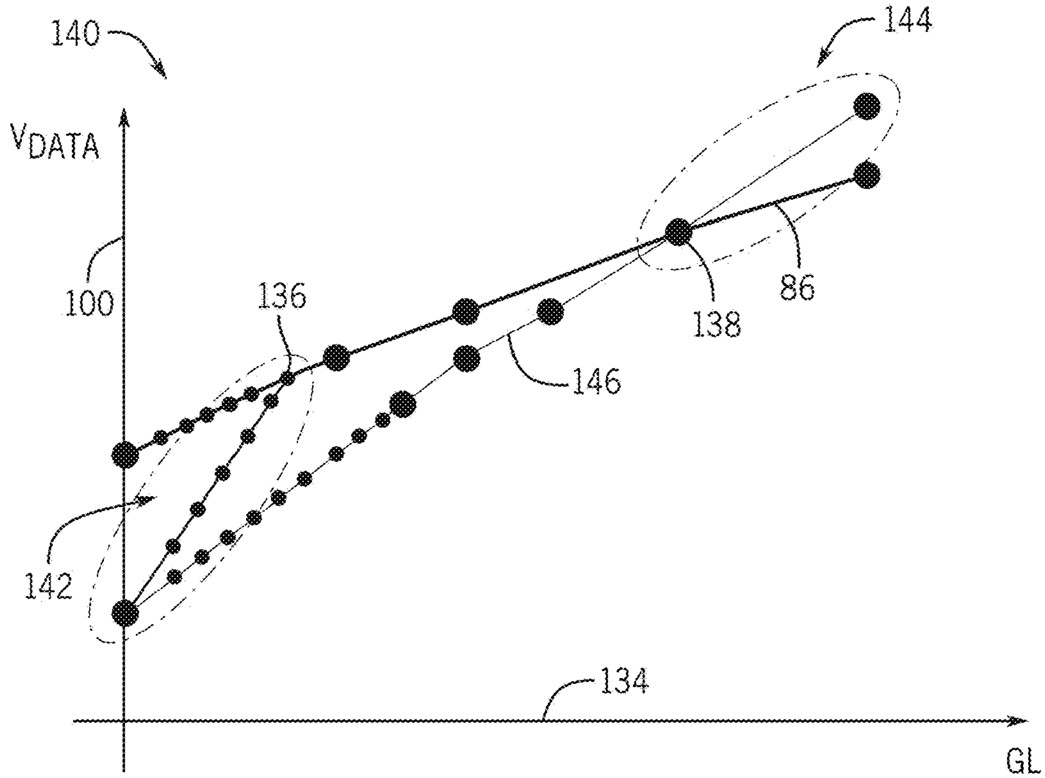
FIG. 13 is a graph of potential calibrated mappings between a voltage domain and a gray level domain to increase a range of the voltage domain relative to the gray level domain, in accordance with an embodiment.

Furthermore, in some embodiments, the calibrated V2G mapping 128 may remap (e.g., relative to the G2V mapping) a portion of the gray levels 134 such as those below a lower tap point threshold 136 and/or above an upper tap point threshold 138 correspond to lower (e.g., relative to the G2V mapping 86) voltage data levels 100 and/or higher (e.g., relative to the G2V mapping 86) voltage data levels 100, respectively, as shown in the graph 140 of FIG. 13. As such, in some embodiments, only lower tap points 142 may be remapped, only higher tap points 144 may be remapped, or both lower tap points 142 and higher tap points 144 are remapped, with certain tap points of the mappings remaining the same. As should be appreciated, the lower tap point threshold 136 and upper tap point threshold 138 may vary based on implementation. Moreover, in some embodiments, the calibrated V2G mapping 128 may include an entire remapping 146 of the spectrum of gray levels, relative to the voltage domain, such that one or zero tap points remain in common with the G2V mapping 86.

The compensated image data 80 may undergo additional processing, such as via one or more other processing blocks 54 (e.g., a dither block) to generate the display image data 56 or be provided to the pixel drive circuitry 58 as the display image data 56. However, returning to FIG. 8, as the G2V mapping 86 does not map to the extended voltage range of the compensated image data 80, a calibrated G2V (gray-to-voltage) mapping 148 may be utilized by the pixel drive circuitry 58 to obtain the corresponding analog voltage levels for driving the display pixels 60. Moreover, the calibrated G2V mapping 148 may be the inverse mapping (e.g., with the same tap points) of the calibrated V2G mapping 128. In other words, the extended voltage range of the compensated voltage data 92 may be realized at the pixel drive circuitry 58 to supply corresponding analog voltages to the display pixels 60 by utilizing the calibrated G2V mapping 148. As should be appreciated, the pixel drive circuitry 58 may or may not convert the display image data 56 to digital voltage data (e.g., compensated voltage data 92 or a further processed version thereof) in the voltage domain prior to selecting the analog voltage for a display pixel 60. For example, in some embodiments, the pixel drive circuitry 58 may directly select the analog voltage based on the display image data 56 in accordance with the calibrated G2V mapping 148, such as implemented in hardware and/or software. Alternatively, the digital voltage data (e.g., compensated voltage data 92 or a further processed version thereof) may be generated based on the display image data 56 and the calibrated G2V mapping 148, and the analog voltages may be selected based on the digital voltage data.

As should be appreciated, the calibrated V2G mapping 128 may effectively create a calibrated gray level domain different (e.g., with respect to corresponding luminances for the individual gray levels) from the gray level domain of the input image data 78. As such, the calibrated gray level domain may not align with the same gamma or other optical calibration of the G2V mapping 86. However, by utilizing the calibrated G2V mapping 148 (e.g., within the pixel drive circuitry 58) to convert the calibrated gray level domain to the analog voltages levels to be applied to the display pixels 60, deviations from the gamma or other optical calibration may canceled, at least in part, as the calibrated G2V mapping 148 is the inverse of the calibrated V2G mapping 128.

As discussed above, the G2V mapping 86 may be specific to the display panel 40 (e.g., type, model, individual, batch, etc.). Moreover, the G2V mapping 86 may be identified during or after manufacturing and the electronic display 12, or image processing circuitry 28 thereof, may be preprogrammed (e.g., in software or hardware) with the G2V mapping 86. For example, a set of look-up-tables (LUTs) or algorithms may identify G2V mappings 86 for different color component display pixels 60 and/or different brightness settings of the electronic display 12. Similarly, the calibrated V2G mapping 128 and/or calibrated G2V mapping 148 may be implemented in hardware or software and may be preprogrammed (e.g., during manufacturing) or generated (e.g., by the image processing circuitry 28) based on the preprogrammed G2V mapping 86.

Figure 14:
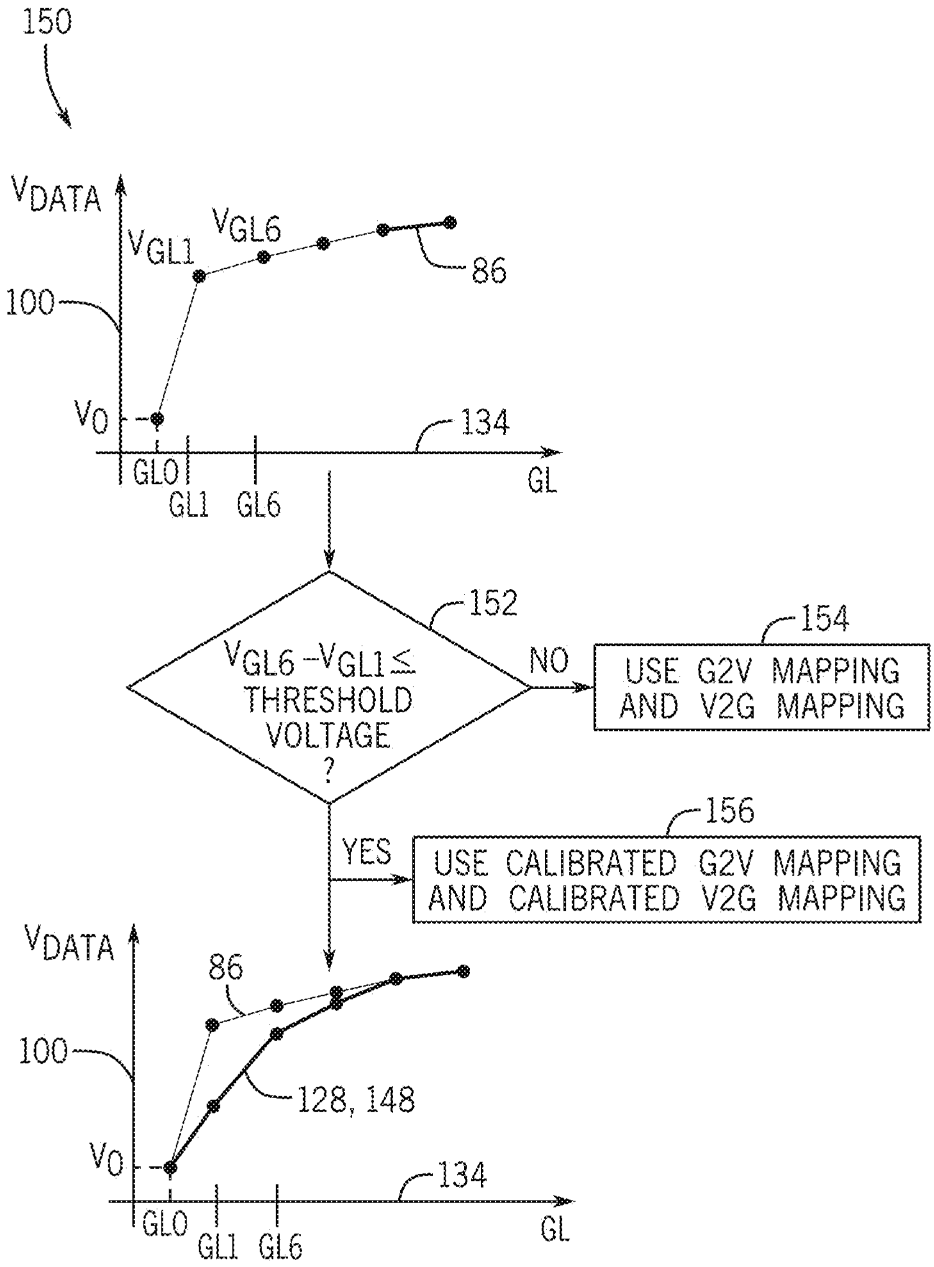
FIG. 14 is a schematic flowchart of an example process for determining whether to utilize a calibrated V2G mapping and calibrated G2V mapping to increase a footroom in the gray level domain, in accordance with an embodiment.

Additionally, in some embodiments, the image processing circuitry 28 may determine whether to utilize the calibrated V2G mapping 128 and calibrated G2V mapping 148 based on a variance in the voltage data levels 100 of the G2V mapping 86. To help illustrate, FIG. 14 is a schematic flowchart of an example process 150 for determining whether to utilize the calibrated V2G mapping 128 and calibrated G2V mapping 148 to increase a footroom in the gray level domain. The G2V mapping 86 (e.g., a selected G2V mapping 86 based on color component, brightness level, etc.) may be analyzed to determine if the difference between the voltage data levels 100 of gray levels 134 (e.g., $V_{GL1}$ and $V_{GL6}$) at the lower end of the gray level domain is less than (e.g., less than or equal to or strictly less than) a threshold voltage (decision block 152). As should be appreciated, the depicted voltage data levels 100 used for the analysis (e.g., $V_{GL1}$ and $V_{GL6}$) are shown as examples, and any set of voltage data levels 100 may be used to determine if the variance is less than the threshold voltage, depending on implementation. For example, the difference of the voltage data levels 100 may be the difference between voltage data level 100 of the lowest gray level (e.g., $V_{GL1}$) and the voltage data level 100 of any other gray level 134. However, voltage data levels 100 corresponding to gray levels 134 closer to that of the lowest gray level (e.g., $V_{GL1}$) may yield a more localized variance of the G2V mapping 86. Furthermore, as discussed herein, the lowest gray level (GL1) may be the lowest non-zero gray level 134. If the difference is not less than the threshold voltage, then the G2V mapping 86 may have sufficient footroom to accommodate the voltage compensations (e.g., defined by the voltage compensation map 90) and/or the amount of clipping (if incurred) may be unperceivable when the display image data 56 is displayed. As such, the G2V mapping 86 and the inverted V2G mapping thereof may be utilized (process block 154). However, if the difference is less than the threshold voltage, then the variance in voltage data levels of the G2V mapping 86 may be relatively flat, meaning the voltage compensations may have larger effects in the gray level domain, and, therefore, the footroom may be insufficient to avoid perceivable clipping effects. As such, the calibrated G2V mapping 148 and calibrated V2G mapping 128 may be utilized (process block 156). Furthermore, while FIG. 14 is discussed above to determine whether to utilize the calibrated V2G mapping 128 and calibrated G2V mapping 148 to increase the footroom in the gray level domain. In a similar manner, the difference in voltage data levels 100 of gray levels 134 at the higher end of the gray level domain may be compared to the same or a different threshold voltage to determine whether to utilize the calibrated V2G mapping 128 and calibrated G2V mapping 148 to increase the headroom in the gray level domain. For example, the difference of the voltage data levels 100 may be the difference between voltage data level 100 of the highest gray level and the voltage data level 100 of any other gray level 134. Moreover, in some embodiments, determinations may be made individually on whether to adapt (e.g., such that a calibrated V2G mapping 128 is used) the lower tap points 142, the higher tap points 144 (or both), based on the difference of the voltage data levels 100 at the lower end of the gray level domain and at the higher end of the gray level domain, respectively. Alternatively, in some embodiments, if either increased footroom or headroom is determined to be warranted, an entire remapping 146 may be utilized.

Figure 15:
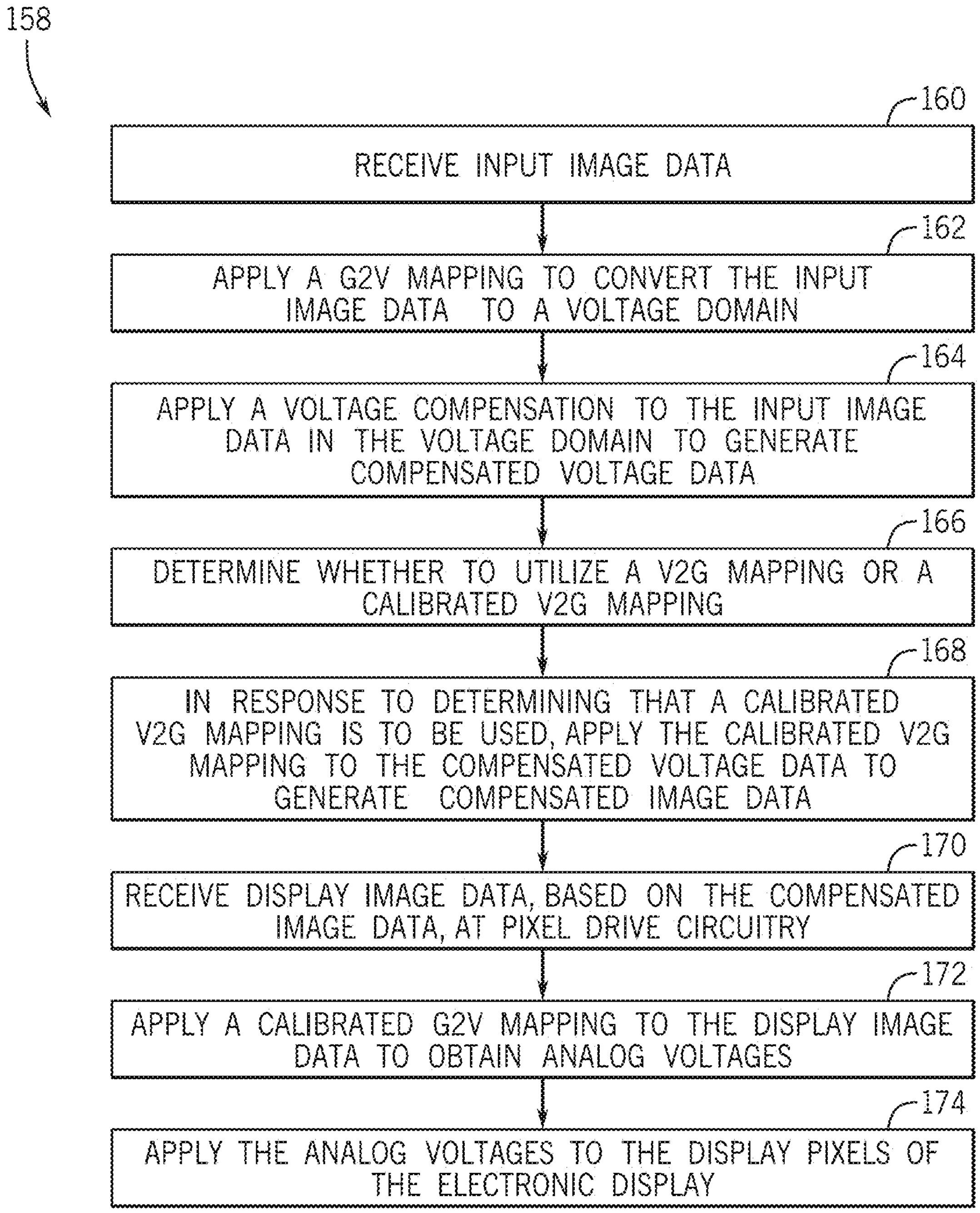
FIG. 15 is a flowchart of an example process for performing sub-pixel uniformity correction (SPUC), in accordance with an embodiment.

Furthermore, to help illustrate techniques of the present disclosure, FIG. 15 is a flowchart of an example process 158 for performing sub-pixel uniformity correction (SPUC). In general, image processing circuitry 28, such as a SPUC block 52 (e.g., SPUC circuitry), may receive input image data 78 (process block 160) and apply a G2V mapping 86 to convert the input image data 78 to a voltage domain (process block 162), such as from a gray level domain. Additionally, a voltage compensation may be applied to the input image data 78 in the voltage domain (e.g., the voltage data 84) to generate compensated voltage data 92 (process block 164). In some embodiments, the image processing circuitry 28 may determine whether to utilize a V2G mapping (e.g., the inverse of the G2V mapping 86) or a calibrated V2G mapping 128 (process block 166). In response to determining that the calibrated V2G mapping 128 is to be used, the image processing circuitry 28 may apply the calibrated V2G mapping 128 to the compensated voltage data 92 to generate compensated image data 80 (process block 168), such as in the gray level domain (e.g., a calibrated gray level domain). Additionally, pixel drive circuitry 58 may receive display image data 56 that is based on the compensated image data 80 (process block 170) and apply a calibrated G2V mapping 148 to the display image data to obtain analog voltages corresponding thereto (process block 172). For example, in some embodiments, the analog voltages may correspond to target luminances 108 of the compensated voltage data 92 or a processed (e.g., via one or more other processing blocks 54) adaptation thereof. Additionally, the analog voltages may be applied to the display pixels 60 of the electronic display 12 (process block 174), such as to display an image corresponding to the input image data 78 corrected for sub-pixel non-uniformities. As should be appreciated, if it is determined (e.g., in process block 166) not to utilize the calibrated V2G mapping 128, process blocks 168, 170, 172, and 174 may be implemented using the G2V mapping 86 and the inverse thereof (e.g. the V2G mapping) instead of the calibrated G2V mapping 148 and the calibrated V2G mapping 128, respectively.

By utilizing a calibrated V2G mapping 128 as part of a sub-pixel uniformity correction, the headroom and/or footroom in the gray level domain may be increased to accommodate voltage data levels 100 of compensated voltage data 92 that would otherwise be clipped by conversion into the gray level domain. Furthermore, by utilizing a calibrated G2V mapping 148 when selecting analog voltages (e.g., via pixel drive circuitry 58), the extended range (e.g., non-clipped range) of the compensated voltage data 92 may be implemented in the pixel drive circuitry 58 to provide corresponding analog voltages to the display pixels 60. As such, perceivable artifacts such as luminance variations on the electronic display 12 may be reduced or eliminated. Furthermore, although the flowcharts discussed above are shown in a given order, in certain embodiments, process/decision blocks may be reordered, altered, deleted, and/or occur simultaneously. Additionally, the flowcharts are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display comprising:

a plurality of display pixels; and pixel drive circuitry configured to receive display image data and select an analog voltage for a display pixel of the plurality of display pixels based on the display image data and a first gray-to-voltage mapping; and image processing circuitry coupled to the electronic display and configured to:

receive input image data in a gray level domain;

convert the input image data from the gray level domain to a voltage domain, generating voltage data based on a second gray-to-voltage mapping different from the first gray-to-voltage mapping;

apply a voltage compensation value to a voltage level, of the voltage data, corresponding to the display pixel to generate compensated voltage data;

determine whether to convert the compensated voltage data from the voltage domain to the gray level domain via a first voltage-to-gray mapping or a second voltage-to-gray mapping at least in part by comparing a difference between a first voltage level of the second gray-to-voltage mapping and a second voltage level of the second gray-to-voltage mapping to a threshold voltage value, wherein the first voltage-to-gray mapping correlates a first range of voltage levels of the voltage domain to a range of gray levels of the gray level domain, wherein the second voltage-to-gray mapping correlates a second range of voltage levels of the voltage domain to the range of gray levels of the gray level domain, wherein the first range of voltage levels of the voltage domain is larger than the second range of voltage levels of the voltage domain; and convert, based on the comparison, the compensated voltage data from the voltage domain to the gray level domain to generate compensated image data based on the first voltage-to-gray mapping, wherein the first voltage-to-gray mapping is an inverse of the first gray-to-voltage mapping, and wherein the display image data is based on the compensated image data.

2. The electronic device of claim 1, wherein the image processing circuitry is configured to generate the first gray-to-voltage mapping based on the second gray-to-voltage mapping.

3. The electronic device of claim 2, wherein the second gray-to-voltage mapping comprises a relationship between the range of gray levels of the gray level domain and the second range of voltage levels of the voltage domain corresponding to respective luminance outputs of an average display pixel of the plurality of display pixels, and wherein the respective luminance outputs correspond to an optical calibration profile.

4. The electronic device of claim 2, wherein the second gray-to-voltage mapping is preset as a property of the electronic display during manufacturing.

5. The electronic device of claim 1, wherein the second voltage-to-gray mapping is an inverse of the second gray-to-voltage mapping.

6. The electronic device of claim 5, wherein the range of gray levels of the gray level domain is increased only below a threshold tap point of the second voltage-to-gray mapping.

7. The electronic device of claim 1, wherein if the difference is less than the threshold voltage value, the image processing circuitry is configured to convert the compensated voltage data from the voltage domain to the gray level domain via the first voltage-to-gray mapping.

8. The electronic device of claim 1, wherein the plurality of display pixels comprises a plurality of organic light emitting diodes (OLEDs).

9. The electronic device of claim 1, wherein the voltage compensation value comprises a voltage offset configured to compensate for a sub-pixel non-uniformity of the display pixel relative to an average pixel of the plurality of display pixels.

10. The electronic device of claim 1, wherein the first voltage-to-gray mapping comprises a calibrated voltage-to-gray mapping.

11. A method comprising:

receiving, via image processing circuitry, input image data in a gray level domain;

converting, via the image processing circuitry, the input image data from the gray level domain to a voltage domain based on a gray-to-voltage mapping to generate voltage data;

applying, via the image processing circuitry, a voltage compensation value to a voltage level, of the voltage data, corresponding to a display pixel of an electronic display to generate compensated voltage data;

determining, via the image processing circuity, whether to convert the compensated voltage data from the voltage domain to the gray level domain via a voltage-to-gray mapping or a calibrated voltage-to-gray mapping at least in part by comparing a difference between a first voltage level of the gray-to-voltage mapping and a second voltage level of the gray-to-voltage mapping to a threshold voltage value, wherein the calibrated voltage-to-gray mapping correlates a first range of voltage levels of the voltage domain to a range of gray levels of the gray level domain, wherein the voltage-to-gray mapping correlates a second range of voltage levels of the voltage domain to the range of gray levels of the gray level domain, and wherein the first range of voltage levels of the voltage domain is larger than the second range of voltage levels of the voltage domain; and converting, via the image processing circuitry and based on the comparison, the compensated voltage data from the voltage domain to the gray level domain to generate compensated image data based on the calibrated voltage-to-gray mapping.

12. The method of claim 11, comprising:

receiving, via pixel drive circuitry of the electronic display, display image data, wherein the display image data is based on the compensated image data;

selecting, via the pixel drive circuitry, an analog voltage for the display pixel based on the display image data and a calibrated gray-to-voltage mapping, wherein the calibrated gray-to-voltage mapping is an inverse of the calibrated voltage-to-gray mapping; and supplying, via the pixel drive circuitry, the analog voltage to the display pixel.

13. The method of claim 11, wherein the first range of voltage levels of the voltage domain is increased below a threshold tap point of the voltage-to-gray mapping and above the threshold tap point of the voltage-to-gray mapping, and wherein the voltage-to-gray mapping is an inverse of the gray-to-voltage mapping.

14. The method of claim 11, wherein the voltage compensation value comprises a voltage offset configured to compensate for a sub-pixel non-uniformity of the display pixel relative to an average pixel of the electronic display.

15. The method of claim 11, comprising determining to convert the compensated voltage data from the voltage domain to the gray level domain via the calibrated voltage-to-gray mapping based on determining the difference is less than the threshold voltage value.

16. The method of claim 15, wherein if the difference is greater than the threshold voltage value, the image processing circuitry is configured to convert the compensated voltage data from the voltage domain to the gray level domain via the voltage-to-gray mapping.

17. A non-transitory, machine-readable medium comprising instructions, wherein, when executed by one or more processors, the instructions cause the one or more processors to perform operations or to control circuitry that performs the operations, wherein the operations comprise:

receiving input image data in a gray level domain;

converting the input image data from the gray level domain to a voltage domain based on a gray-to-voltage mapping to generate voltage data;

applying a voltage compensation value to a voltage level, of the voltage data, corresponding to a display pixel of an electronic display to generate compensated voltage data;

determining whether to convert the compensated voltage data from the voltage domain to the gray level domain via a voltage-to-gray mapping or a calibrated voltage-to-gray mapping at least in part by comparing a difference between a first voltage level of the gray-to-voltage mapping and a second voltage level of the gray-to-voltage mapping to a threshold voltage value, wherein the voltage-to-gray mapping is an inverse of the gray-to-voltage mapping, wherein the calibrated voltage-to-gray mapping correlates a first range of voltage levels of the voltage domain to a range of gray levels of the gray level domain, wherein the voltage-to-gray mapping correlates a second range of voltage levels of the voltage domain to the range of gray levels of the gray level domain, and wherein the first range of voltage levels of the voltage domain is larger than the second range of voltage levels of the voltage domain; and converting, based on the comparison, the compensated voltage data from the voltage domain to the gray level domain to generate compensated image data based on the calibrated voltage-to-gray mapping.

18. The non-transitory, machine-readable medium of claim 17, wherein the operations comprise selecting an analog voltage for the display pixel based on display image data and a calibrated gray-to-voltage mapping, wherein the display image data is based on the compensated image data, and wherein the calibrated gray-to-voltage mapping is an inverse of the calibrated voltage-to-gray mapping.

19. The non-transitory, machine-readable medium of claim 18, wherein the operations comprise supplying the analog voltage to the display pixel.

20. The non-transitory, machine-readable medium of claim 17, wherein the voltage compensation value comprises a voltage offset configured to compensate for a sub-pixel non-uniformity of the display pixel relative to an average pixel of the electronic display.

* * * * *